United States Patent [19]
Suzuki et al.

[11] Patent Number: 5,389,969
[45] Date of Patent: * Feb. 14, 1995

[54] APPARATUS USING BRIGHTNESS INFORMATION FROM A PHOTOMETERING CIRCUIT AND A BRIGHTNESS-CONVERTED GREEN COMPONENT FROM A COLOR METERING CIRCUIT TO ULTIMATELY ADJUST WHITE BALANCE

[75] Inventors: Masahiro Suzuki, Kawasaki; Masahiro Juen, Yokohama, both of Japan

[73] Assignee: Nikon Corporation, Tokyo, Japan

[ * ] Notice: The portion of the term of this patent subsequent to Feb. 22, 2011 has been disclaimed.

[21] Appl. No.: 170,744

[22] Filed: Dec. 21, 1993

Related U.S. Application Data

[63] Continuation of Ser. No. 974,496, Nov. 12, 1992, Pat. No. 5,289,268.

[30] Foreign Application Priority Data

Nov. 21, 1991 [JP] Japan .................. 3-331569

[51] Int. Cl.⁶ .................. H04N 9/73; H04N 9/04
[52] U.S. Cl. .................. 348/223; 348/655
[58] Field of Search .................. 348/223–228, 348/655–658; H04N 9/64, 9/04, 9/73 C, 9/73

[56] References Cited

U.S. PATENT DOCUMENTS

| | | | |
|---|---|---|---|
| 4,584,598 | 4/1986 | Kutaragi | 348/226 |
| 4,774,564 | 9/1988 | Konishi | 348/224 |
| 4,805,010 | 2/1989 | Shroyer et al. | 348/224 |
| 4,814,864 | 3/1989 | Pritchard | 348/227 |
| 4,918,519 | 4/1989 | Suzuki et al. | 348/224 |
| 4,992,855 | 2/1991 | Takai | 348/226 |
| 5,001,552 | 3/1991 | Okino | 348/224 |
| 5,021,874 | 6/1991 | Tsugita | 348/227 |
| 5,065,232 | 11/1991 | Kondo | 348/224 |
| 5,099,313 | 3/1992 | Suemoto et al. | 348/226 |
| 5,289,268 | 2/1994 | Suzuki et al. | 348/223 |

Primary Examiner—Victor R. Kostak
Assistant Examiner—John W. Miller
Attorney, Agent, or Firm—Shapiro and Shapiro

[57] ABSTRACT

A white balance adjuster of a camera comprises a photometering unit for metering a brightness of an object based on a light directed to an image pickup unit of the camera, a color metering unit for metering a color temperature of a periphery of the camera, a plurality of white balance control tables and a selector for selecting one of the white balance control tables in accordance with object brightness information produced by the photometering unit and brightness converted information of the periphery of the camera produced by the color metering unit. A color balance of an output signal of the image pickup unit is adjusted in accordance with the selected white balance control table.

4 Claims, 6 Drawing Sheets

APPARATUS USING BRIGHTNESS INFORMATION FROM A PHOTOMETERING CIRCUIT AND A BRIGHTNESS-CONVERTED GREEN COMPONENT FROM A COLOR METERING CIRCUIT TO ULTIMATELY ADJUST WHITE BALANCE

This is a continuation application of Ser. No. 07/974,496, filed Nov. 12, 1992, now U.S. Pat. No. 5,289,268, issued Feb. 22, 1994.

BACKGROUND OF THE INVENTION

1. Field of the Invention

The present invention relates to a white balance adjuster of an electronic still camera for recording a still image.

2. Related Background Art

A human eye has an adaptability that a white object appears white even if an illumination light varies. On the other hand, in a video camera or an electronic still camera which converts an image to an electrical signal for recording, a color temperature of an illumination light around an object is metered and a white balance is adjusted for the image signal based on the color temperature so that a white object appears (is recorded or reproduced) white.

Figure 3:
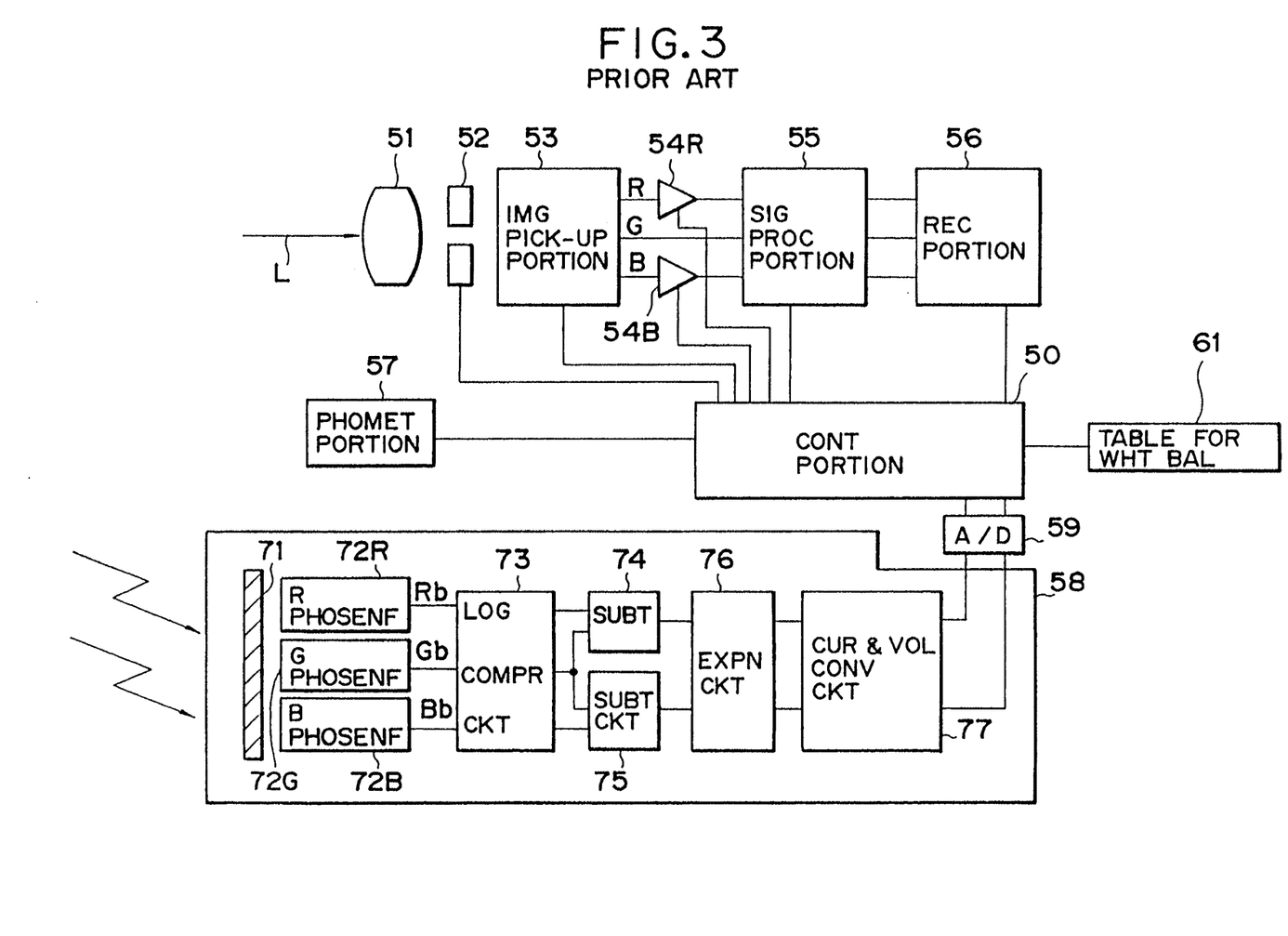
FIG. 3 shows a block diagram of a configuration of a white balance adjuster in a prior art camera.

A configuration of a white balance adjuster in a prior art color camera is shown in FIG. 3. In FIG. 3, a light L from an object is sensed by an image pickup unit 53 through an optical member 51 and a diaphragm member 52. The image pickup unit 53 converts an input light to an electrical signal and comprises a solid-state image pickup device such as a CCD (charge transfer device) or a MOS device and a circuit for sampling an output signal from the image pickup device at a predetermined timing, and produces chrominance signals for R (red), G (green) and B (blue).

The G output from the image pickup unit 53 is supplied directly to the signal processing unit 55 but the R output and the B output are supplied to the signal processing unit 55 through white balancing variable gain amplifiers 54R and 54B which are controlled by a control unit 50 is accordance with an output from a color metering unit 58. The signal processing unit 55 is connected to a recording unit 56 which adjusts gains for the chrominance signals, set-up levels, gammas and knees, and records an image signal. The diaphragm member 52 is controlled by the control unit 50 in accordance with the output from a photometering unit 57 which meters a brightness of the object.

The control of the white balancing variable gain amplifiers 54R and 54B is now explained. In the color metering unit 58, the light around the camera is directed to R photo-sensor 72R, a G photo-sensor 72G and a B photo-sensor 72B through a diffusion plate 71, and it produces a red component (Rb), a green component (Gb) and a blue component (Bb) of the incident light. Those color component signals are logarithmically compressed by a logarithmic compression circuit 73 which produces outputs log Rb, log Gb and log Bb. They are converted to log (Rb/Gb) and log (Bb/Gb) by subtractors 74 and 75, and reverse-logarithmically converted to Rb/Gb and Bb/Gb by an expander 76. Then, they are supplied to an A/D converter 59 through a current-voltage converter 77, and digital outputs thereof are supplied to the control unit 50. The gains of the variable gain amplifiers 54R and 54B are controlled in accordance with the digital outputs of Rb/Gb and Bb/Gb detected by the color metering unit 58 by referring a white balancing control Table 61.

Figure 4:
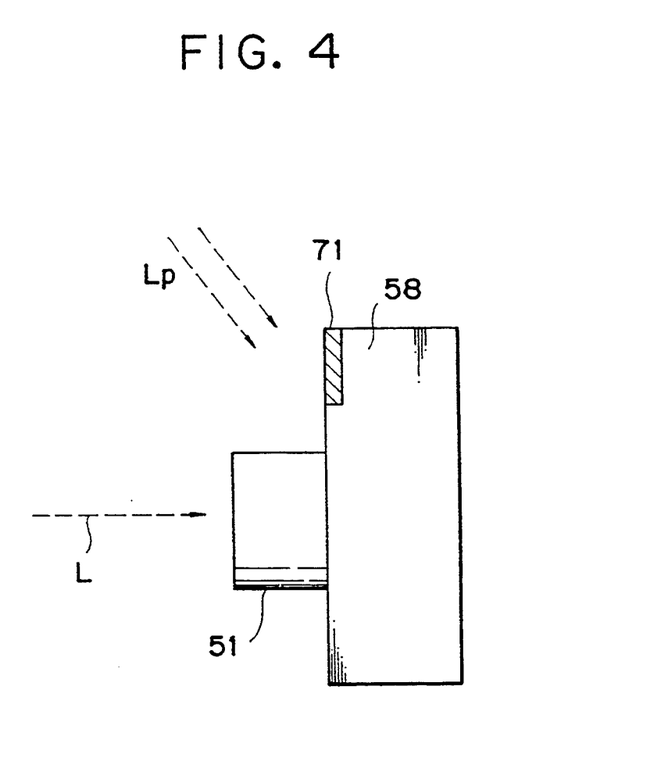
FIG. 4 shows an external arrangement of a color metering unit in a common camera.

As shown in FIG. 4, the diffusion plate 71 through which the light is directed to the color metering unit 58 is usually arranged at a front top of the camera while facing front (object) to sense a camera peripheral light Lp, and the photo-metering unit 57 usually meters the light directed through the optical member 51 by splitting it in the camera.

In the prior art camera, a color temperature around the object and a color temperature in the vicinity of the color metering device may be detected differently in a fine weather photographing condition. For example, when an object is to be photographed in a forward light condition, the vicinity of the color metering device is shaded by the camera or a photographer because a light incident area to the color metering device is usually on the front plane of the camera, and hence the color temperature of the periphery of the object is different from the color temperature of the vicinity of the color metering device. If the white balance is adjusted based on the output of the color metering device, the object is photographed reddish.

It is ideal that the white balance control table is changed in accordance with the condition of the illumination light to the object. For example, since the change in the color temperature varies with a condition of fine weather at out-door, cloudy weather at out-door or in-door, it is desirable to use different white balance control tables. However, in the prior art adjuster, a white balance control table determined by a rule of greatest common divisor is used to adjust the white balance and proper white balance adjustment to cope with the condition of the illumination light to the object is not attained.

SUMMARY OF THE INVENTION

It is an object of the present invention to provide a white balance adjuster which optimally adjusts a white balance in accordance with the condition of the illumination light to the object.

The present invention provides a white balance adjuster comprising photometering means for metering a brightness of an object based on a light directed to image pickup means of a camera, and color metering means for metering a color temperature in a vicinity of the camera. A color balance of the output signal from the image pickup means is adjusted in accordance with the color temperature information produced by the color metering means by referring to a white balance control table. It further comprises selection means for selecting one of a plurality of white balance control tables based on a difference between object brightness information produced by the photometering means and brightness converted information around the camera produced by the color metering means and the respective brightness information. The white balance is adjusted in accordance with the color temperature information produced by the color metering means by referring to the selected white balance control table.

An operation of the present invention is explained below. In the present invention, the object brightness information produced by the photo-metering means and the brightness converted information produced by the color metering means are used. The condition of the illumination light to the object such as forward light or backward light in fine weather, cloudy weather, shade or in-door is determined based on the difference between those information and the respective brightness information. Several white balance control tables for the respective conditions are prepared, and one white balance control table is selected in accordance with the determination of the condition of the illumination light so that proper white balance is attained in accordance with the color temperature information from the color metering means.

DESCRIPTION OF THE PREFERRED EMBODIMENTS

Figure 1:
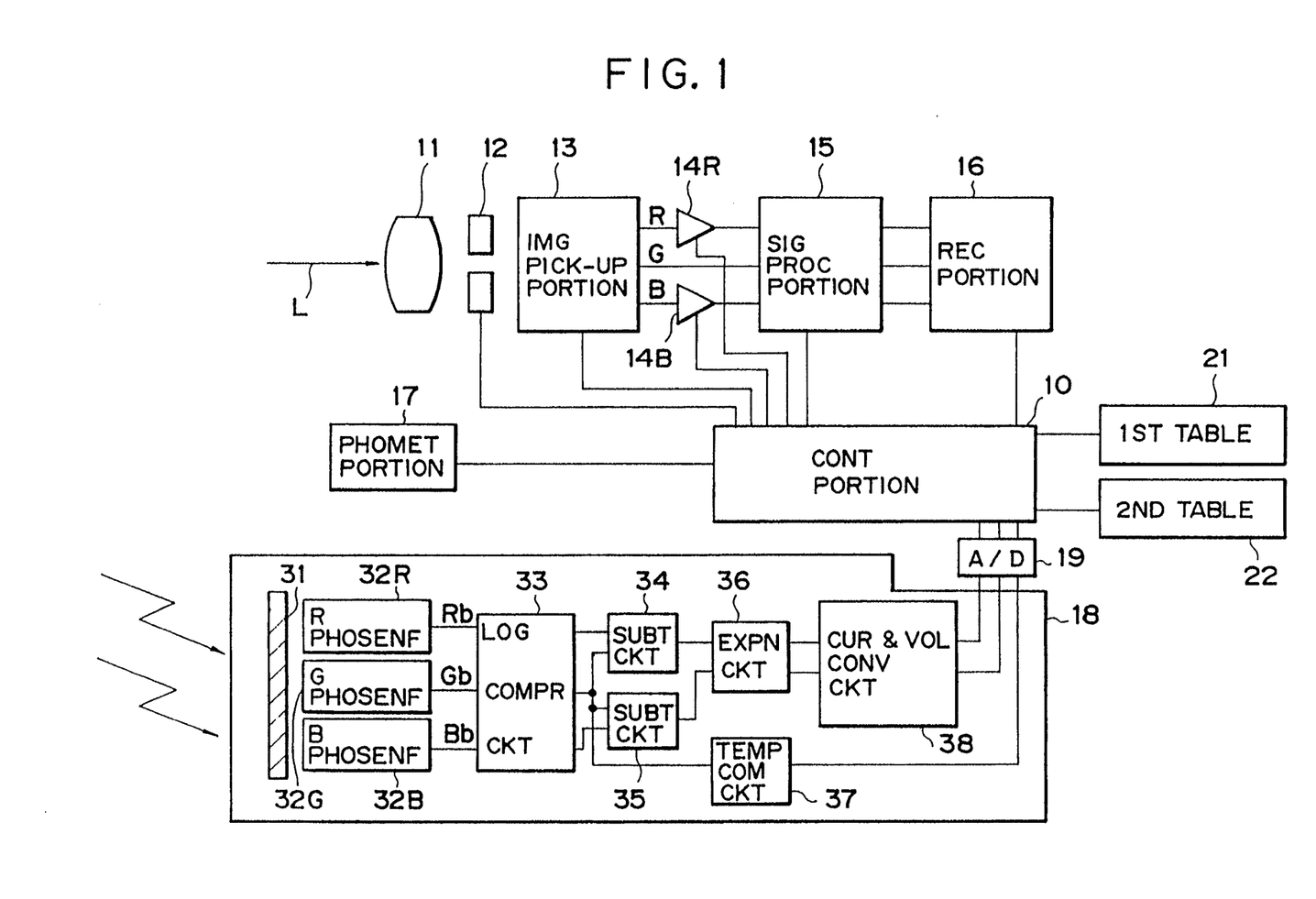
FIG. 1 shows a block diagram of a schematic configuration of a white balance adjuster in accordance with one embodiment of the present invention.
Figure 5:
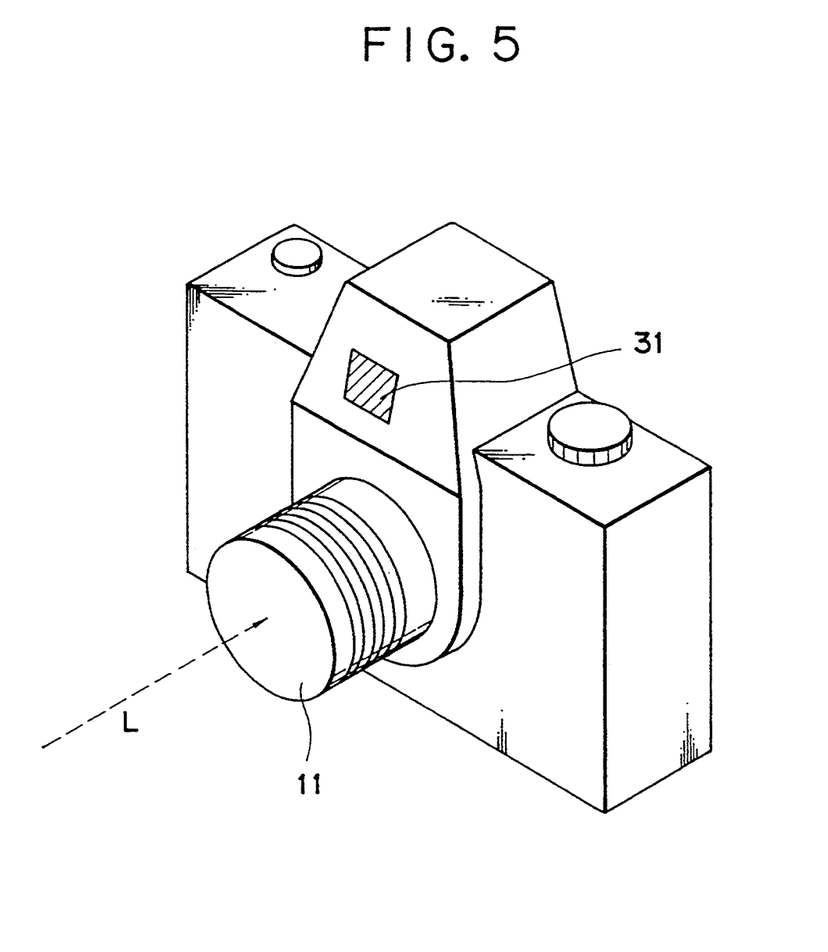
FIG. 5 shows a perspective view of a camera in accordance with the embodiment of the present invention.

The present invention is now explained in more detail by embodiments. FIG. 5 shows an arrangement of a color metering unit and FIG. 1 shows a configuration of a white balance adjuster of a camera in one embodiment of the present invention. In FIG. 1, a light L from an object is sensed by an image pickup unit 13 through an optical member 11 and a diaphragm member 12. The image pickup unit 13 converts the light to an electrical signal and comprises a solid-state image pickup device such as a CCD or a MOS device and a circuit for sampling an output signal from the image pickup device at a predetermined timing. It produces chrominance signals for R (red), G (green) and B (blue). The R output and the B output from the image pickup unit 13 are supplied to a signal processing unit 15 through white balancing variable gain amplifiers 14R and 14B, respectively, and the G output is supplied directly to the signal processing unit 15. The signal processing unit 15 is connected to a recording unit 16 which adjusts gains for the chrominance signals, set-up levels, gammas and knees and records an image signal.

The variable gain amplifiers 14R and 14B are similar to those in the prior art in that they are controlled by a control unit 10 but a feature of the present embodiment resides in that they are controlled by the control unit 10 in accordance with an output of a color metering unit 18 and an output of a photometering unit 17 to be described later.

A diaphragm member 12 is controlled by the control unit 10 in accordance with the output from the photometering unit 17 which meters a brightness of the object. While the photometering unit 17 is off an optical axis of the optical member 11 in FIG. 1, it may be on the optical axis to form a so-called TTL (through the lens) system.

The control of the white balancing variable gain amplifiers 14R and 14B is explained below. In the color metering unit 18, a light around the camera body is directed through a diffusion plate 31 and it is sensed by an R photo-sensor 32R, a G photo-sensor 32G and a B photo-sensor 32B. The respective photo-sensors detect a red component (Rb), a green component (Gb) and a blue component (Bb) of the incident light. Those chrominance signals are logarithmically compressed by a logarithmic compression circuit 33 which produces outputs log Rb, log Gb and log Bb.

The outputs log Rb and log Gb, and the outputs log Gb and log Bb are sent to subtractors 34 and 35, respectively, which convert them to log (Rb/Gb) and log (Bb/Gb), respectively. They are sent to an expander 36 where they are reverse-logarithmically converted to Rb/Gb and Bb/Gb, which are sent to an A/D converter 19 through a current-voltage converter 38 and converted to digital signals, which are supplied to the control unit 10.

On the other hand, in the present embodiment, the logarithmically compressed signal log Gb is sent to a temperature compensation circuit 37 and an output therefrom is converted by an A/D converter 19 to a digital signal, which is supplied to the control unit 10 for use as a camera peripheral brightness information.

In the white balance adjustment, the white balance is adjusted in accordance with the digital outputs of the color temperature information Rb/Gb and Bb/Gb from the color metering unit 18 by referring to the white balance control table. In the present embodiment, two white balance control tables are prepared. A first control table 21 is to be used for cloudy weather, shade, in-door and others, and a second control table 22 is to be used for forward light and backward light in fine weather.

The control unit 10 determines a condition of an illumination light to the object based on an object brightness Bv which is the output of the photometering unit 17 and a green component brightness converted value Ev (log Gb) from the color metering unit 18 to select the first or second white balance control table. The selection of the first white balance control table is first explained.

If an absolute value of a difference between the two brightness information, |Bv−Ev (log Gb)| is larger than a predetermined constant K, that is, when the following formula is met, it is determined that the object is in the condition of forward or backward light in fine weather, and the second white balance control table is selected.

$$|Bv - Ev\,(\log Gb)| > K \qquad (1).$$

In the condition of forward or backward light in fine weather, the difference of the brightness of the object and the periphery of the camera body is large. Thus, a threshold K is determined based on experimental data or measured data to determine the condition of the illumination light to the object. If the condition of forward or backward light in fine weather is detected, the second white balance control table 22 is selected and the white balancing variable gain amplifiers 14R and 14B are adjusted by the control values determined by the outputs of the color temperature information Rb/Gb and Bb/Gb from the color metering unit 18.

In the present embodiment, in order to prevent misjudgement in the selection, a decision by the following formula (2) is also made.

$$Bv > Kb \text{ or } Ev\,(\log Gb) > Ke \qquad (2).$$

The formula (2) requires that the object brightness Bv which is the output of the photometering unit 17 is larger than a constant Kb, or the green component brightness converted value Ev (log Gb) of the color metering unit 18 is larger than a constant Ke. The actual condition of the illumination light (for example, at least the determination of fine weather or in-door) is supplementarily determined based on the brightness information of the object or the brightness converted value from the color metering unit.

Such determination is required because the difference between the brightnesses of the object and the camera periphery increases as the formula (1) is met by the effect of lighting in in-door photographing, for example. If it is determined as the forward or backward light in fine weather, the white balance is controlled by referring to the white balance control table 22 for the fine weather, and proper white balance adjustment is not attained. This may be avoided by providing manual switching means but the determination by the formula (2) is done in the present embodiment in order to enable more correct and easier handling.

When the first white balance control table is selected, the second white balance control table is not selected. When the formula (1) is not met, or when the formula (1) is met but the formula (2) is not met, it is determined that the object is in the condition of cloudy weather, shade or in-door, and the first white balance control table 21 is used to adjust the white balancing variable gain amplifiers 14R and 14B in accordance with the control values determined by the outputs of the color information Rb/Gb and Bb/Gb from the color metering unit 18.

Figure 2:
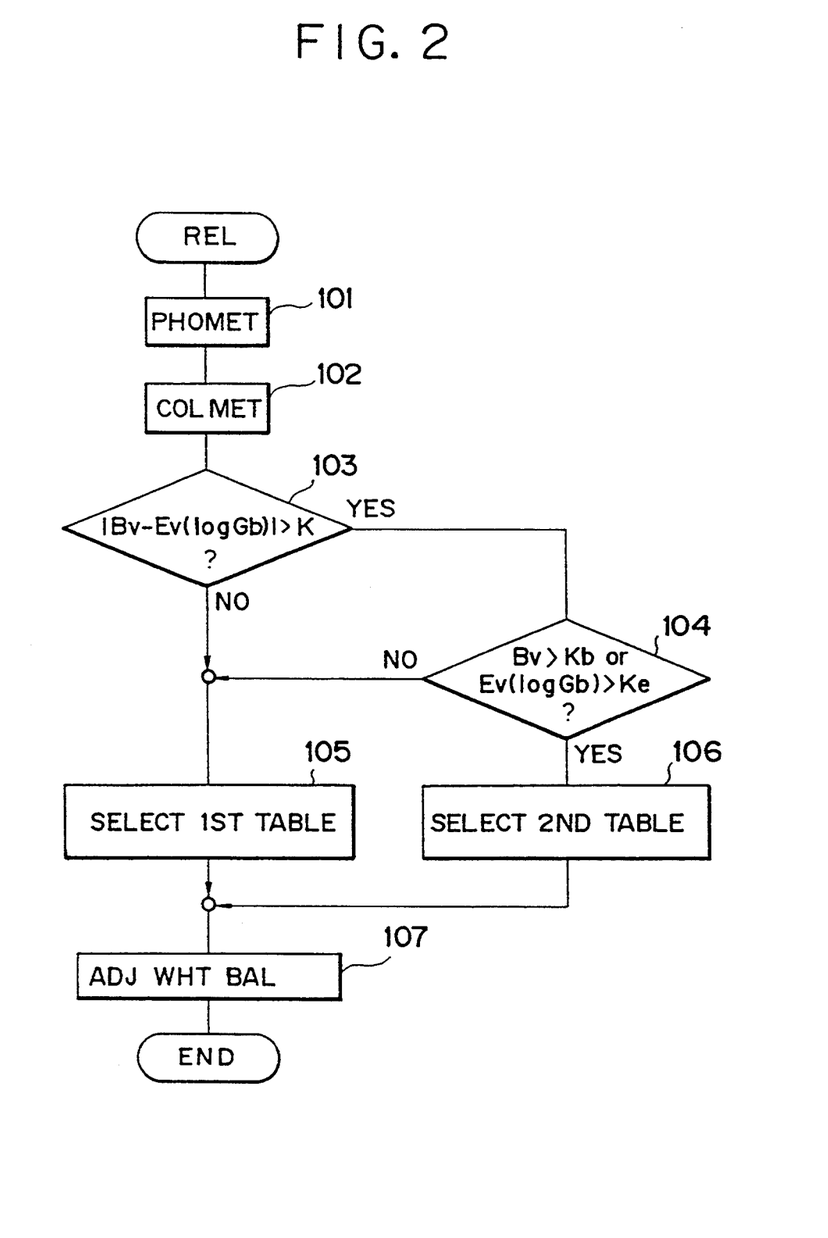
FIG. 2 shows a flow chart of a white balance control sequence in the embodiment.

An operation of the white balance adjustment of the control unit 10 in the present embodiment is now explained in detail with reference to a flow chart of FIG. 2.

When a release switch of the camera is depressed at the start of the photographing operation, the brightness of the object is measured by the photometering unit 17 and the color temperature in the periphery of the camera and the brightness converted value are measured by the color metering unit 18 (steps 101 and 102).

The green component brightness converted value Ev (log Gb) is subtracted from the object brightness Bv which is the output of the photometering unit 17, and the absolute difference thereof and the constant K are compared (step 103).

If the absolute difference of the formula (1) is no greater than K, it is determined that the condition is not fine weather, and the process proceeds to a step 105 where the first white balance control table is selected (step 105).

On the other hand, if the absolute difference of FIG. (1) is greater than the constant K, the process proceeds to a step 104 where it is determined whether the object brightness Bv which is the output of the photometering unit 17 is greater than the constant Kb, or whether the green component brightness converted value Ev (log Gb) of the color metering unit 18 is greater than the constant Ke (step 104).

In the step 104, if the condition (the formula (2)) is met, the process proceeds to a step 106 where the second white balance control table is selected (step 106). If the condition is not met, it is determined that the object is in the condition of cloudy weather, shade or in-door, and the process proceeds to the step 105 to select the first white balance control table.

When the object is in the condition of cloudy weather, shade or in-door, the first white balance control table 21 is selected as it is in the prior art, and when the object is in the condition of forward or backward light in fine weather, the second white balance control table 22 prepared for that condition is selected. The white balancing variable gain amplifiers 14R and 14B are adjusted in accordance with the control values determined by the outputs of the color information Rb/Gb and Bb/Gb from the color metering unit 18 by referring to the selected white balance control table so that proper white balance adjustment to the recorded image is attained (step 107).

A second embodiment is now explained with reference to FIG. 6.

In the first embodiment, two conditions were considered. In the present embodiment, the following three conditions are considered.

| | |
|---|---|
| $Bv-Ev(\log Gb) > K1 \ldots (3)$ | Forward light in fine weather (First white balance control table) |
| $K2 \leq Bv-Ev(\log Gb) \leq K1 \ldots (4)$ | Cloudy weather, shade (Second white balance control table) |
| $Bv-Ev(\log Gb) < K2 \ldots (5)$ | Backward light in fine weather (Third white balance control table) | where K1, K2: constants

Figure 6:
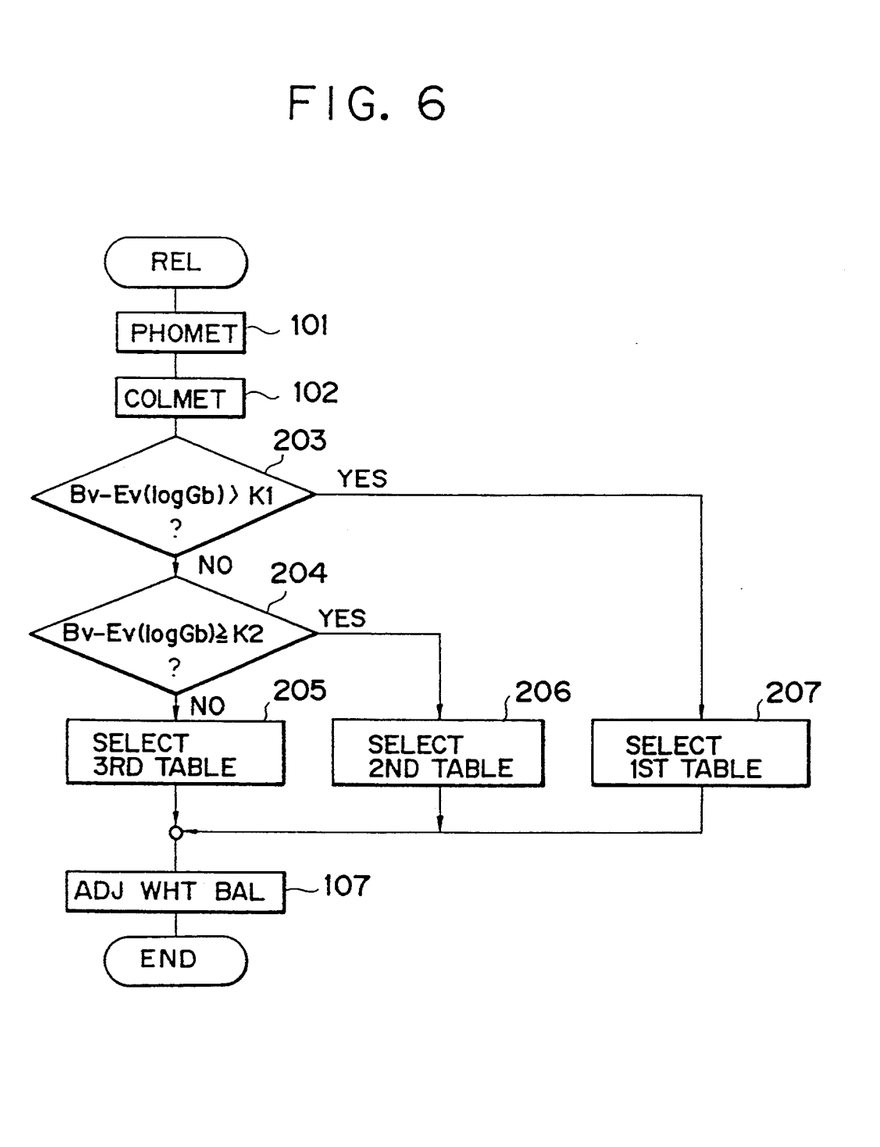
FIG. 6 shows a flow chart of a control sequence in a second embodiment.

In the control shown in FIG. 6, if a decision in a step 203 is YES, the process proceeds to a step 207 to select the first white balance control table, and if the decision is NO, the process proceeds to a step 204. If a decision in the step 204 is YES, the process proceeds to a step 206 to select the second white balance control table, and if the decision is NO, the process proceeds to a step 205 to select the third white balance control table. Other steps are identical to those of the first embodiment and the explanation thereof is omitted.

More conditions may be set and white balance control tables for those conditions may be prepared to adjust the white balancing variable gain amplifiers.

In accordance with the present invention, the white balance control table is selected in accordance with the difference between the object brightness information and the color temperature information brightness conversion so that proper white balance adjustment is attained to comply with the condition of the illumination light to the object.

Since the color metering device through which the light is directed to the color metering unit of the camera is usually arranged on the front plane of the camera, when the object is to be photographed in the condition of forward light in fine weather, good white balance adjustment is attained even if the vicinity of the color metering device is shadowed by the camera or the photographer.

What is claimed is:

1. A method of adjusting a white balance in a camera, wherein a brightness of an object is metered on the basis of light, the light being directed to an image pickup device of the camera to produce object brightness information, and a color temperature of light at a periphery of the camera is metered to produce brightness converted information which is a green component of light, and a white balance is controlled so as to adjust a color balance of an output signal from said image pickup device on the basis of the object brightness information and the brightness converted information.

2. A method of adjusting a white balance in a camera, wherein a brightness of an object is metered on the basis of light, the light being directed to an image pickup device of the camera to produce object brightness information, and a color temperature of light at a periphery of the camera is metered to produce brightness converted information, and a white balance is controlled so as to adjust a color balance of an output signal from said image pickup device on the basis of a difference between the object brightness information and the brightness converted information.

3. A method of adjusting a white balance in a camera according to claim 2, wherein the white balance is controlled on the basis of the object brightness information in addition to the difference.

4. A method of adjusting a white balance in a camera according to claim 2, wherein a white balance control table is selected from white balance control tables included in the camera for adjusting the white balance.

* * * * *